3,301,898
ARYL-TETRACHLORO-AZA-PROPENES AND
PROCESS FOR THE PRODUCTION THEREOF
Eberhart Degener, Leverkusen, Hans Holtschmidt, Cologne-Stammheim, and Hans-Georg Schmelzer, Cologne-Buchforst, Germany, assignors to Farbenfabriken Bayer Aktiengesellschaft, Leverkusen, Germany, a German corporation
No Drawing. Filed Oct. 15, 1963, Ser. No. 316,443
Claims priority, application Germany, Dec. 14, 1962,
F 38,554
13 Claims. (Cl. 260—566)

The present invention relates to the production of chlorinated aza-propenes which are chlorinated intermediates and final products, useful as insecticides, as well as to processes for the production of such intermediates and final products.

It is an object of the present invention to provide 3-aryl-1,1,3,3-tetrachloro-2-aza-propenes of the formula

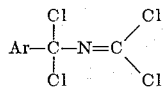

wherein Ar represents an optionally substituted aryl radical and a process for their production.

It is known to produce isocyanide dichlorides by chlorination of mustard oils at low temperatures. But so far the chlorination of aryl-methyl mustard oils at low temperatures has not been investigated.

It has now been found that 3-aryl-1,1,3,3-tetrachloro-2-aza-propenes of the formula

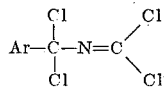

may be produced in high yields if aryl mustard oils of the formula $$Ar—CH_2—N=C=S$$

are chlorinated in a first step at temperatures below 50° C. and in a second step at temperatures between 50 and 240° C. This reaction corresponds to the following equation:

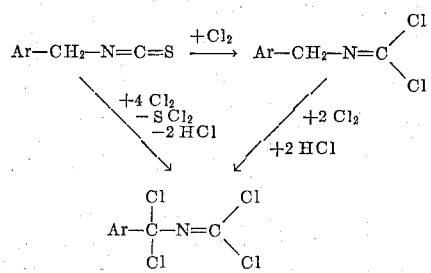

In these formulae Ar represents aromatic radicals, which optionally may be substituted once or several times by substituents which remain inert in the chlorination, such as halogen atoms, aryl radicals, perhalogenated alkyl and cycloalkyl radicals, arylalkyl radicals perhalogenated in the aliphatic parts of the molecule, and also by phenoxy, nitro, nitrile, SO₂Cl,

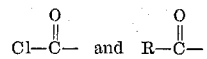

groups, R advantageously representing aromatic radicals which optionally may carry the substituents mentioned in respect of Ar; R can however also represent perhalogenated alkyl and cycloalkyl radicals as well as aralkyl radicals perhalogenated in the aliphatic part of the molecule. However, nonhalogenated aliphatic, cycloaliphatic and araliphatic substituents of Ar, or R, are considered if an additional chlorination of these radicals is desired when carrying out the instant process.

It is known that perchloroalkyl tetrachlor-aza-propenes and perchloralkyl isocyanide dichlorides, respectively, are obtained by high-temperature chlorination of tertiary aliphatic amines and carbamic acid chlorides of secondary aliphatic amines (Angew. Chem. 74, 848 (1962)). However, this process is unsuccessful for the production of aryl tetrachlor-aza-propenes, since the reaction deviates in uncontrollable manner, e.g., due to chlorination of the nucleus and resinification, under the energetic conditions of the dealkylating high-temperature chlorination.

The chlorination of arylmethyl mustard oils in accordance with the instant process can be effected in a single operation without intermediate separation of the arylmethyl isocyanide dichlorides formed in the first chlorination stage. However, it is possible for the chlorination to be interrupted at the arylmethyl isocyanide dichloride stage, and, possibly after the separation thereof, to continue the chlorination at a later time.

The yields of aryltetrachlor-aza-propene are in the region of more than 60% of the theoretical.

The following are mentioned as arylmethyl mustard oils: benzyl mustard oil, 4-chlorobenzyl mustard oil, 3,4-, 2,4- and 2,6-dichlorobenzyl mustard oil, pentachlorobenzyl mustard oil, 4-fluorobenzyl mustard oil, 1- and 2-naphthylmethyl mustard oil, 4-phenylbenzyl mustard oil, 4-phenoxybenzyl mustard oil, 4-nitrobenzyl mustard oil, 4-trichloromethyl benzyl mustard oil, 4-trifluoromethylbenzyl mustard oil, 4-isothiocyanatomethylbenzophenone and, in the event of a desired additional chlorination of radicals which can be chlorinated, also 4-methylbenzyl mustard oil, 4-(phenylmethyl)-benzyl mustard oil, 4-cyclohexylbenzyl mustard oil and 4-acetylbenzyl mustard oil.

The chlorination reactions are carried out by first of all introducing dry chlorine gas at low temperatures into the mustard oils or into their solutions in suitable inert solvents. After absorption of the quantity of chlorine necessary for the isocyanide dichloride stage, the absorption generally stops. The sulphur dichloride and the solvents which may have been used are extracted in vacuo and the chlorination is continued at higher temperatures, advantageously with exposure to light and possibly in the presence of a suitable solvent of higher boiling point, until theoretical absorption has occurred, and then fractionation is carried out. It is for example possible to use diethyl ether and chlorinated hydrocarbons, such as chloroform and carbon tetrachloride as inert solvents for the first chlorination stage at low temperatures. Tetrachlorethane or trichlorobenzene are for example suitable for the second chlorination stage.

Instead of elementary chlorine, it is optionally possible also to use a chlorinating agent such as sulphuryl chloride. The chlorination in the first stage is advantageously effected at temperatures between 0 and 50° C., whereas the chlorination in the second stage is carried out at temperatures above 50° C., and advantageously between 50 and 240° C.

On account of their high chlorine contents, the products obtained by the process are effective insecticides. In spraying tests carried out with 3-phenyl-1,1,3,3-tetrachloro-2-aza-propene with a boiling point 150–160° C./15 mm. in concentrations of 0.1% a 100% destruction of drosophila was obtained.

*Example 1*

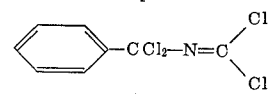

(a) Chlorine is introduced at 20 to 25° C. into a solution of 50 parts by weight of benzyl mustard oil in 300 parts by weight of tetrachlorethane until an exothermic reaction can no longer be observed. The solvent and sulphur dichloride are extracted in vacuo and chlorination is continued while slowly raising the temperature to 150° C. and exposure to light until the weight is constant. The reaction solution is fractionated in vacuo; at 150–160° C./15 mm., there are obtained 55 parts by weight of 3-phenyl-1,1,3,3-tetrachlor-2-aza-propene. The compound corresponds, as regards its properties, to the compound obtained under (b). Yield: 64% of the theoretical, calculated on the benzyl mustard oil introduced.

$C_8H_7Cl_2N(188)$—Calculated: C, 51.10; H, 3.72; Cl, 37.75; N, 7.44. Found: C, 51.37; H, 3.82; Cl, 37.75; N, 7.59.

(b) 21 parts by weight of chlorine are introduced at 15° C. into a solution of 20 parts by weight of benzyl mustard oil in 70 parts by weight of absolute ether. The substance is blown with nitrogen, ether is extracted and the substance distilled in vacuo. At 117–118° C./17 mm. there are obtained 20 parts by weight of benzyl isocyanide dichloride. Yield 79% of the theoretical.

Chlorine is introduced at refluxing temperature into the solution of 52.6 parts by weight of benzyl isocyanide dichloride in 150 parts by weight of trichlorethane while being exposed to ultra-violet light until no further increase in weight is to be observed. By fractionation, there are obtained 52 parts by weight of 3-phenyl-1,1,3,3-tetrachlor-2-aza-propene with the boiling point 150–160° C./15 mm. The substance becomes crystalline on standing and melts at 56° C. After recrystallisation from cyclohexane, the melting point rises to 58° C. Yield 72% of the theoretical, calculated on the benzyl isocyanide dichloride introduced.

$C_8H_5Cl_4N(257)$—Calculated: C, 37.30; H, 1.95; Cl, 55.20; N, 5.45. Found: C, 37.52; H, 2.10; Cl, 55.25; N, 5.54.

*Example 2*

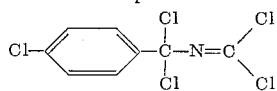

Chlorine is introduced into the solution of 65 parts by weight of 4-chlorobenzyl mustard oil in 200 parts by weight of carbon tetrachloride while cooling at 20 to 25° C. until the exothermic reaction is ended. The solvent and sulphur dischloride formed are distilled off in vacuo and the chlorination is continued with a slow rise in the temperature to 180° C. and with exposure to ultra-violet light until the weight is constant. The reaction product is fractionated in vacuo. At 109–113° C./0.05 mm. the 3 - (4'-chlorophenyl)-1,1,3,3-tetrachlor-2-aza-propene distills over as a colorless oil with the refractive index $n_{20}^D=16.146$. Yield 78 parts by weight, 76% of the theoretical.

$C_8H_4Cl_5N(291.5)$—Calculated: C, 32.93; H, 1.37; N, 4.81. Found: C, 33.30; H, 1.54; N, 4.71.

*Example 3*

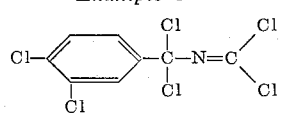

Chlorine is introduced into the solution of 43.6 parts by weight of 3,4-dichlorobenzyl mustard oil in 150 parts by weight of carbon tetrachloride with external cooling at 20 to 25°. After completing the absorption of chlorine, the solvent and sulphur dichloride are distilled off in vacuo. The residue is further chlorinated with a slow rise in temperature up to 180° C. and with irradiation with ultra-violet light until the weight is constant. By fractional distillation under high vacuum, there are obtained 62 parts by weight, 95% of the theoretical, of 3 - (3',4' - dichlorophenyl) - 1,1,3,3 - tetrachlor - 2 - aza-propene as a colorless oil with a boiling point of 132–135° C./0.08 mm. and a refractive index $n_{20}^D=1.6180$.

$C_8H_3Cl_6N(326)$—Calculated: C, 29.45; H, 0.92; Cl, 65.34; N, 4.29. Found: C, 29.82; H, 0.97; Cl, 65.35; N, 4.34.

We claim:

1. Aza-propene compounds of the general formula

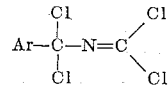

wherein Ar is selected from the group consisting of phenyl, naphthyl, and substituted phenyl which is substituted with a member selected from the group consisting of halogen, phenyl, phenoxy, nitro, halo-lower alkyl, and benzoyl radicals.

2. Aza-propene compounds of the general formula

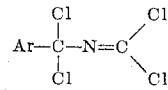

wherein Ar is selected from the group consisting of phenyl, chlorophenyl, fluorophenyl, naphthyl, diphenyl, phenoxy phenyl, nitro-phenyl, chloromethyl phenyl, fluoromethyl phenyl, and benzoyl phenyl radicals.

3. 3-phenyl-1,1,3,3-tetrachloro-2-aza-propene 4. 3 - (4' - chlorophenyl) - 1,1,3,3 - tetrachloro-2-aza-propene 5. 3 - (3',4' - dichlorophenyl)-1,1,3,3-tetrachloro-2-aza-propene 6. Process for the production of aza-propene compounds of the formula

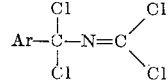

wherein Ar is selected from the group consisting of phenyl, naphthyl, and substituted phenyl which is substituted with a member selected from the group consisting of halogen, phenyl, phenoxy, nitro, halo-lower alkyl, and benzoyl radicals, which comprises reacting an isothiocyanate of the formula

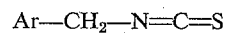

wherein Ar is selected from the group consisting of phenyl, naphthyl, and substituted phenyl which is substituted with a member selected from the group consisting of halogen, phenyl, phenoxy, nitro, halo-lower alkyl, and benzoyl radicals, with a chlorination agent selected from the group consisting of chlorine and sulfuryl chloride, said reacting being effected in a first step at a temperature of below 50° C. and in a second step at a temperature of 50 to 240° C., and recovering the aza-propene compound thereby formed.

7. Process for the production of aza-propene compounds of the formula

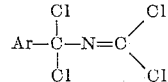

wherein Ar is selected from the group consisting of phenyl, naphthyl, and substituted phenyl which is substituted with a member selected from the group consisting of halogen, phenyl, phenoxy, nitro, halo-lower alkyl, and benzoyl radicals, which comprises reacting an isothiocyanate of the formula

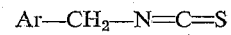

wherein Ar is selected from the group consisting of phenyl, naphthyl, and substituted phenyl which is substituted with a member selected from the group consisting of halogen, phenyl, phenoxy, nitro, halo-lower alkyl, and benzoyl radicals, with a chlorination agent selected from the group consisting of chlorine and sulfuryl chloride, said reacting being effected in a first step at a temperature of below 50° C. in an inert organic solvent and in a second step at a temperature of 50 to 240° C. in another inert organic solvent, and recovering the aza-propene compound thereby formed.

8. Process according to claim 7 wherein the inert organic solvent used in said first step is selected from the group consisting of diethyl ether and chlorinated hydrocarbons, and wherein the inert organic solvent used in said second step is selected from the group consisting of tetrachloroethane and trichloro-benzene.

9. Process for the production of aza-propene compounds of the formula

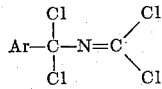

wherein Ar is selected from the group consisting of phenyl, naphthyl, and substituted phenyl which is substituted with a member selected from the group consisting of halogen, phenyl, phenoxy, nitro, halo-lower alkyl, and benzoyl radicals, which comprises reacting an isothiocyanate of the formula

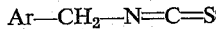

wherein Ar is selected from the group consisting of phenyl, naphthyl, and substituted phenyl which is substituted with a member selected from the group consisting of halogen, phenyl, phenoxy, nitro, halo-lower alkyl, and benzoyl radicals, with a chlorination agent selected from the group consisting of chlorine and sulfuryl chloride, said reacting being effected in a first step at a temperature of below 50° C. in an inert organic solvent, recovering the partially chlorinated product thereby formed, and reacting such formed product with such chlorination agent in a second step at a temperature of 50 to 240° C., with irradiation with ultra-violet light, and recovering the aza-propene compound thereby formed.

10. Process for the production of aza-propene compounds of the formula

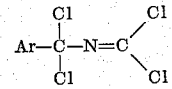

wherein Ar is a member selected from the group consisting of phenyl, chlorophenyl, fluorophenyl, naphthyl, diphenyl, phenoxy phenyl, nitro-phenyl, chloromethyl phenyl, fluoromethyl phenyl, and benzoyl phenyl radicals, which comprises reacting an isocyanate of the formula

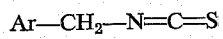

wherein Ar is a member selected from the group consisting of phenyl, chlorophenyl, fluorophenyl, naphthyl, diphenyl, phenoxy phenyl, nitro-phenyl, chloromethyl phenyl, fluoromethyl phenyl, and benzoyl phenyl radicals, with a chlorination agent selected from the group consisting of chlorine and sulfuryl chloride, said reacting being effected in a first step at a temperature of below 50° C. in an inert organic solvent, recovering the partially chlorinated product thereby formed, and reacting such formed product with such chlorination agent in a second set at a temperature of 50 to 240° C., and recovering the aza-propene compound thereby formed.

11. Process for the production of 3-phenyl-1,1,3,3-tetrachloro-2-aza-propene which comprises reacting benzyl isothiocyanate with chlorine in a first step at a temperature of about 20° C. in tetrachloroethane, recovering the partially chlorinated product thereby formed, and reacting such formed product with chlorine in a second step at 150° C. with irradiation with ultra-violet light and recovering the 3 - phenyl - 1,1,3,3 - tetrachloro - 2 - aza-propene formed by distillation in vacuo.

12. Process for the production of 3-(4'-chlorophenyl)-1,1,3,3-tetrachloro-2-aza-propene which comprises reacting 4-chloro-benzyl isothiocyanate with chlorine in a first step at a temperature of about 20° C. in carbontetrachloride, recovering the partially chlorinated product thereby formed, and reacting such formed product with chlorine in a second step at 180° C. with irradiation with ultra-violet light and recovering the 3-(4'-chlorophenyl)-1,1,3,3-tetrachloro-2-aza-propene formed by distillation in vacuo.

13. Process for the production of 3-(3',4'-dichlorophenyl) - 1,1,3,3 - tetrachloro - 2-aza-propene which comprises reacting 3,4 - dichlorobenzyl isothiocyanate with chlorine in a first step at a temperature of about 20° C. in carbontetrachloride, recovering the partially chlorinated product thereby formed, and reacting such formed product with chlorine in a second step at 180° C. with irradiation with ultra-violet light and recovering the 3-(3',4'-dichlorophenyl)-1,1,3,3-tetrachloro-2-aza-propene formed by distillation in vacuo.

References Cited by the Examiner

UNITED STATES PATENTS 3,190,918   6/1965   Holtschmidt _____ 260—566

FOREIGN PATENTS 908,733   10/1962   Great Britain.

CHARLES B. PARKER, *Primary Examiner.*

R. V. HINES, *Assistant Examiner.*